United States Patent
Hamilton

(10) Patent No.: US 12,484,497 B2
(45) Date of Patent: Dec. 2, 2025

(54) TREE WATERING DEVICE

(71) Applicant: HLZ Limited, Hamilton (NZ)

(72) Inventor: Brendan Craig Hamilton, Hamilton (NZ)

(73) Assignee: HLZ Limited, Hamilton (NZ)

( * ) Notice: Subject to any disclaimer, the term of this patent is extended or adjusted under 35 U.S.C. 154(b) by 0 days.

(21) Appl. No.: 18/551,647

(22) PCT Filed: Mar. 17, 2022

(86) PCT No.: PCT/NZ2022/050032
§ 371 (c)(1),
(2) Date: Sep. 21, 2023

(87) PCT Pub. No.: WO2022/203521
PCT Pub. Date: Sep. 29, 2022

(65) Prior Publication Data
US 2024/0172612 A1    May 30, 2024

(30) Foreign Application Priority Data

Mar. 22, 2021 (NZ) .......................... 774200
Aug. 23, 2021 (AU) ............................ 2021221389

(51) Int. Cl.
*A01G 27/06* (2006.01)
*A01G 27/00* (2006.01)
(Continued)

(52) U.S. Cl.
CPC .............. *A01G 29/00* (2013.01); *A01G 17/00* (2013.01)

(58) Field of Classification Search
CPC .... A01G 29/00; A01G 27/006; A01G 27/003; A01G 27/02; A01G 27/005; A01G 27/06
See application file for complete search history.

(56) References Cited

U.S. PATENT DOCUMENTS 4,087,938 A * 5/1978 Koch ..................... A01G 29/00
                                                                    D23/218
4,304,528 A    12/1981 Jordan
(Continued)

FOREIGN PATENT DOCUMENTS

| CN | 106718210 | | 5/2020 |
| KR | 100602909 | * | 5/2005 |
| WO | 2007/136531 | | 11/2007 |

OTHER PUBLICATIONS

International Search Report and Written Opinion in corresponding International Patent Application No. PCT/NZ2022/050032, mailed Jun. 30, 2022 (7 pages).

(Continued)

*Primary Examiner* — Kristen C Hayes
(74) *Attorney, Agent, or Firm* — Leason Ellis LLP

(57) ABSTRACT

A device for watering a tree comprises a water container, an inlet to receive water into the container, an inlet valve configured to close the inlet to the container when a water level within the container reaches a maximum water level and open when the water level drops below the maximum water level, a pressure relief mechanism to limit a pressure in the container to a maximum pressure greater than ambient pressure, and one or more outlets to allow water to discharge from the container to apply water to a rootzone of a tree in use.

15 Claims, 11 Drawing Sheets

(51) Int. Cl.
  *A01G 27/02*   (2006.01)
  *A01G 29/00*   (2006.01)
  *A01G 17/00*   (2006.01)

(56) References Cited

U.S. PATENT DOCUMENTS

| | | | |
|---|---|---|---|
| 4,961,285 | A | 10/1990 | Jenkins et al. |
| 6,848,483 | B1 | 2/2005 | Atkinson et al. |
| 2009/0249689 | A1* | 10/2009 | Tran ..................... A01G 27/005 47/79 |
| 2012/0159843 | A1 | 6/2012 | Whitcomb |
| 2023/0130299 | A1* | 4/2023 | Sitz .......................... G05D 9/02 222/1 |

OTHER PUBLICATIONS

Extended European Search Report in EP Application No. 22776200.2-1105/4312514, mailed Jan. 17, 2025 (8 pages).

* cited by examiner

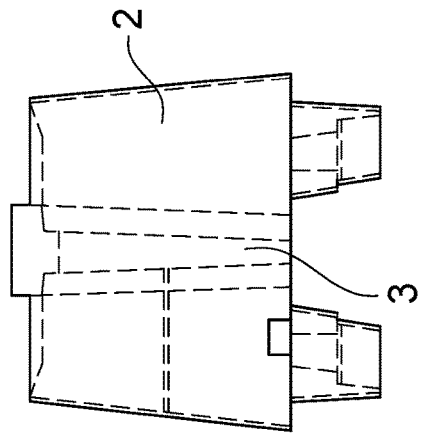
FIG. 15C
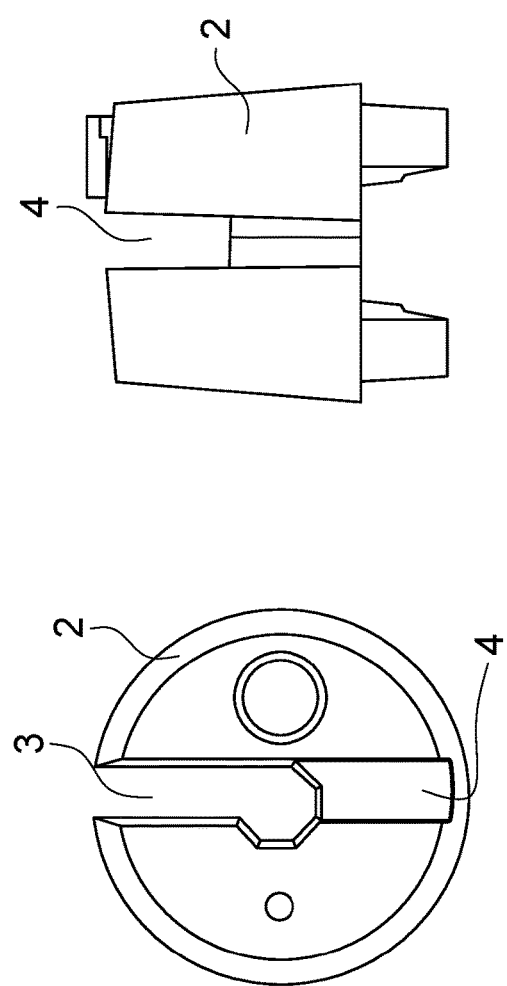
FIG. 15B
FIG. 15A
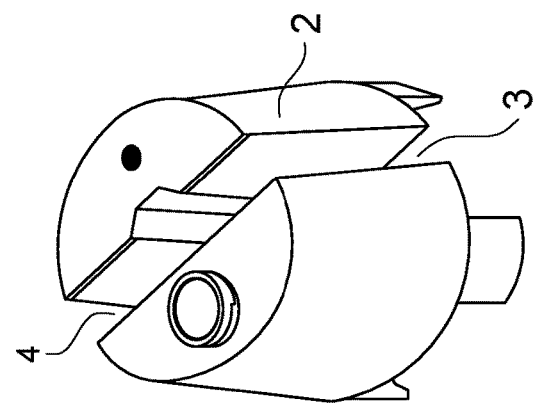
FIG. 15E
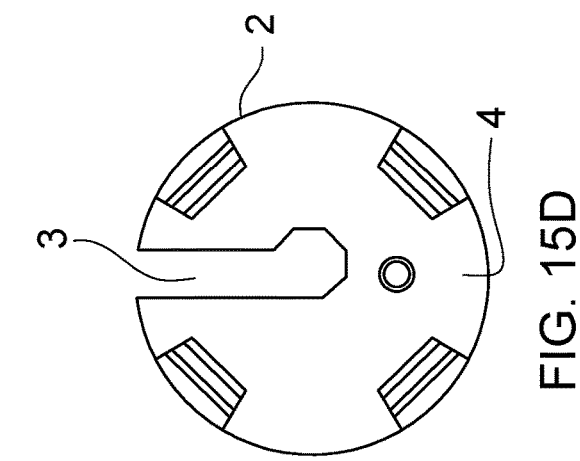
FIG. 15D

TREE WATERING DEVICE

This patent application is a U.S. National Phase Application under 35 U.S.C. § 371 of International Patent Application No. PCT/NZ2022/050032, filed on Mar. 17, 2022, which claims priority from Australian patent application no. 2021221389, filed on Aug. 23, 2021, and New Zealand patent application no. 774200, filed on Mar. 22, 2021, all of which are incorporated by reference, as if expressly set forth in their respective entireties herein.

TECHNICAL FIELD

This invention relates to a device for watering a tree, in particular, for applying water to an individual tree within an orchard of many trees.

BACKGROUND

In order to achieve optimal tree growth and production of fruit it is necessary to provide an optimal amount of water to the tree. Trees are typically watered by applying water to the ground within a rootzone of the tree. A correct amount of water should be provided to the root zone. To little water essentially results in drought conditions resulting in poor growth, production and ultimately health of the tree. Providing too much water can also adversely affect the performance and health of a tree. Too much water can result in disease affecting the tree and defects in fruit.

Furthermore, applying more water than necessary results in wastage. Water that is not utilised by a tree may be lost through evaporation or drainage past the root zone. Water is a precious resource, and there is a significant cost associated with providing water to a tree. Applying too much water incurs unnecessary cost.

Trees are typically grown within an orchard of many trees. Large commercial orchards may contain 100s or even 1000s of trees. An orchard can include trees at difference stages of development, and may contain both large mature trees and small young trees. For example, a mature tree may be removed from an orchard for various reasons, and a new young replacement tree may be planted in its place. Areas of an orchard may be planted out at different times again resulting in trees of various maturity.

Large orchards typically include an irrigation system to provide water to the trees within the orchard. An irrigation system may include a control system to provide water automatically based on a watering frequency. For example, for an established orchard an irrigation system may provide 100 to 200 L of water to each tree two or three times a week, up to around a total of 400 to 500 L per tree per week.

An irrigation system typically applies the same amount of water to each individual tree within the orchard. Typically, the amount of water provided and irrigation durations are determined based on the requirements of the most productive trees, being the larger more mature trees. This approach can result in younger or smaller trees within an orchard receiving too little or too much water, resulting in the negative outcomes mentioned above. Over or under watering a young tree can result in the tree taking much longer to grow and reach maturity, or in extreme cases the tree may die, requiring a further replacement.

Although the volume of irrigation a young tree receives from an irrigation system may be far beyond what the tree requires, most of the water is not available to the tree. Because the rootzone is so small in diameter and shallow only a very small percentage of the applied water arrives and stays in the rootzone, the remainder falls far away from the small trees roots or goes deeper into the soil past the young trees root depth (to the depth where the large trees need it to be). Because of this, and particularly if long durations between irrigations occur, there is only a small volume of water that makes it to the rootzone and is available to the young tree. The remainder is unavailable or out of reach of the young roots and is essentially wasted. This leads to a case where although the trees have been supplied excessive irrigation, well in excess of needs, only a small amount is available, and they become short of water and water/drought stressed.

The reference to any prior art in the specification is not, and should not be taken as, an acknowledgement or any form of suggestion that the prior art forms part of the common general knowledge in any country.

DISCLOSURE OF INVENTION

It is an object of the present invention to address any one or more of the above problems or to at least provide the industry with a useful choice.

According to a first aspect of the present invention there is provided a device for watering a tree, the device comprising:
a water container,
an inlet to receive water into the container,
an inlet valve configured to close the inlet to the container when a water level within the container reaches a maximum water level and open when the water level drops below the maximum water level,
a pressure relief mechanism to limit a pressure in the container to a maximum pressure greater than ambient pressure, and
one or more outlets to allow water to discharge from the container to apply water to a rootzone of a tree in use.

In some embodiments, the device is configured so that as the container fills with water the pressure in the container reaches the maximum pressure and the pressure relief mechanism operates to limit the pressure to the maximum pressure. When the pressure in the container is at the maximum pressure a flow rate through the outlet assists with flushing debris from the outlet. The device is configured so that as the container fills with water the pressure within the container results in a flow rate through the outlet that assists with flushing debris from the outlet.

In some embodiments, the device is configured so that as the container fills with water the pressure within the container results in a first flowrate through the outlet(s) and as the container empties of water the pressure within the container results in a second flow rate, wherein the second flow rate is substantially less than the first flow rate. For example, the second flow rate may be less than 25% of the first flow rate. Preferably the first flow rate is substantially equal to or greater than a nominal flow rate of the outlet(s).

In some embodiments, the outlet comprises a pressure compensated outlet device configured to provide a nominal flow rate for a predetermined pressure range. Preferably the device is configured so that as the container fills with water the pressure within the container results in a flowrate substantially equal to or greater than the nominal flow rate of the pressure compensated outlet device. Preferably, the device is configured so that as the container empties of water the pressure within the container decreases to below the maximum pressure resulting in a flow rate substantially less than the nominal flow rate.

In some embodiments, the device comprises an air let valve configured to prevent a vacuum within the container as the container empties of water.

In some embodiments, the air inlet valve is a duckbill valve.

In some embodiments, the pressure relief mechanism is an umbrella valve comprising an umbrella element and wherein the umbrella element and the duckbill valve are integrally formed in a single unitary member.

In some embodiments, the device is configured to remain connected to a pressurised water supply system in use.

In some embodiments, the device is configured to be connected to a pressurised water supply system, and wherein the maximum pressure is substantially less than a pressure of the pressurised water supply system.

Preferably the pressurised water supply system is an irrigation system for an orchard and the device is configured to form a water accumulator for the irrigation system for providing water to a tree at a flowrate significantly less than a flow rate provided by the irrigation system.

In some embodiments, the device is configured to provide water continuously to a tree.

In some embodiments, the or each outlet is configured to emit a drip flow rate.

In some embodiments, the or each outlet comprises a drip emitter outlet device.

In some embodiments, the outlet is interchangeable to allow outlets with different flow rates to be fitted to the container.

In some embodiments, the container comprises:
a first vertical slot that extends a full height of the container to receive a tree therein via a slot opening at an external side wall of the container, and
a second vertical slot that extends from a top of the container to part way down the container, the second vertical slot extending to a side wall of the container opposite to the first slot, wherein the second vertical slot extends diametrically opposite to the first vertical slot.

In some embodiments, the first and second slots divide an upper portion of the container into two upper portions separated by the first and second slots, and
wherein the pressure relief mechanism is fitted to one of the two upper portions, and the device comprises a tube or conduit provided to an inside of the container, wherein the tube has a first end located in one of the two upper portions of the container and a second opposite end located in the other one of the two upper portions of the container, to fluidly connect the two upper portions of the container together. The first and second ends of the tube are positioned above a maximum water level in the container set by the inlet valve.

In some embodiments, the container has a volume of approximately 20 L to 200 L.

According to a second aspect of the present invention there is provided a device for watering a tree, the device comprising:
a water container,
an inlet to receive water into the container, and
one or more outlets to allow water to discharge from the container to apply water to a rootzone of a tree in use, wherein the container comprises:
a first vertical slot that extends a full height of the container to receive a tree therein via a slot opening at an external side wall of the container, and
a second vertical slot that extends from a top of the container to part way down the container, the second vertical slot extending to a side wall of the container opposite to the first slot,
wherein the second vertical slot extends diametrically opposite to the first vertical slot.

The device according to the second aspect may have one or more features as described above in relation to the first embodiment, According to a third aspect of the present invention there is provided a container for holding a volume of water, the container comprising:
an inlet to receive water into the container,
a first vertical slot that extends a full height of the container to receive a tree therein via a slot opening at an external side wall of the container, and
a second vertical slot that extends from a top of the container to part way down the container, the second vertical slot extending to an external side wall of the container opposite to the first slot, wherein the second vertical slot extends diametrically opposite to the first vertical slot, and
one or more outlets to allow water to discharge from the container to apply water to a rootzone of a tree in use.

In some embodiments, the first and second slots are aligned to extend in a straight line across a top of the container.

In some embodiments the second slot extends vertically for a substantial portion of the height of the container.

The container of the third embodiment may include one or more related features of the device described above in relation to the first embodiment of the invention.

In this specification and claims, terms such as "upper", "lower", "top" or "bottom" are used in a relative sense only and are not intended to be limiting to any one orientation.

In this specification and claims, unless the context suggests otherwise, the term "tree" is in not intended to be limited to mean only those plants with a single woody stem or trunk but is to be understood to refer to any type of tree, plant, vine and the like.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to". Where in the foregoing description, reference has been made to specific components or integers of the invention having known equivalents, then such equivalents are herein incorporated as if individually set forth.

The invention may also be said broadly to consist in the parts, elements and features referred to or indicated in the specification of the application, individually or collectively, in any or all combinations of two or more of said parts, elements or features, and where specific integers are mentioned herein which have known equivalents in the art to which the invention relates, such known equivalents are deemed to be incorporated herein as if individually set forth.

Further aspects of the invention, which should be considered in all its novel aspects, will become apparent from the following description given by way of example of possible embodiments of the invention.

BRIEF DESCRIPTION OF THE DRAWINGS

An example embodiment of the invention is now discussed with reference to the Figures.

FIG. 12A shows the pressure relief valve open and the air inlet valve closed, and FIG. 12B shows the pressure relief valve closed and the air inlet valve open.

FIGS. 15A to 15E show various views of a container of the device of FIG. 14. FIG. 15A is a plan view, FIG. 15B is a side view, FIG. 15C is a sectional view on a centreline of the container to show a bottom wall of a second slot of the container, FIG. 15D is a bottom view, and FIG. 15E is an isometric view.

BEST MODES FOR CARRYING OUT THE INVENTION

Figure 1:
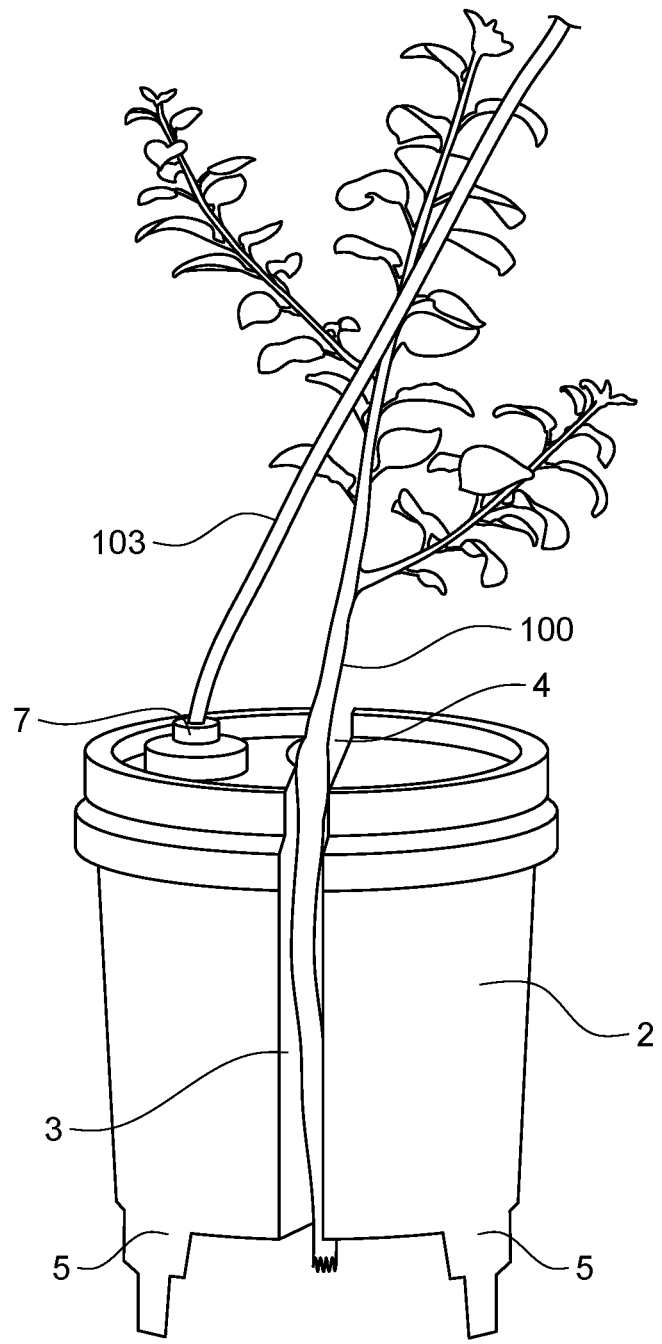
FIG. 1 illustrates a watering device according to an aspect of the present invention. The device is shown positioned for use with a tree received in a slot of the device.

A device for watering a tree according to the present invention is described with reference to the Figures. With reference to FIG. 1, the device 1 comprises a container 2 for holding a volume of water. The volume of the container may be suitably sized based on watering requirements, however, may be between 20 Litres to around 200 Litres.

Figure 2:
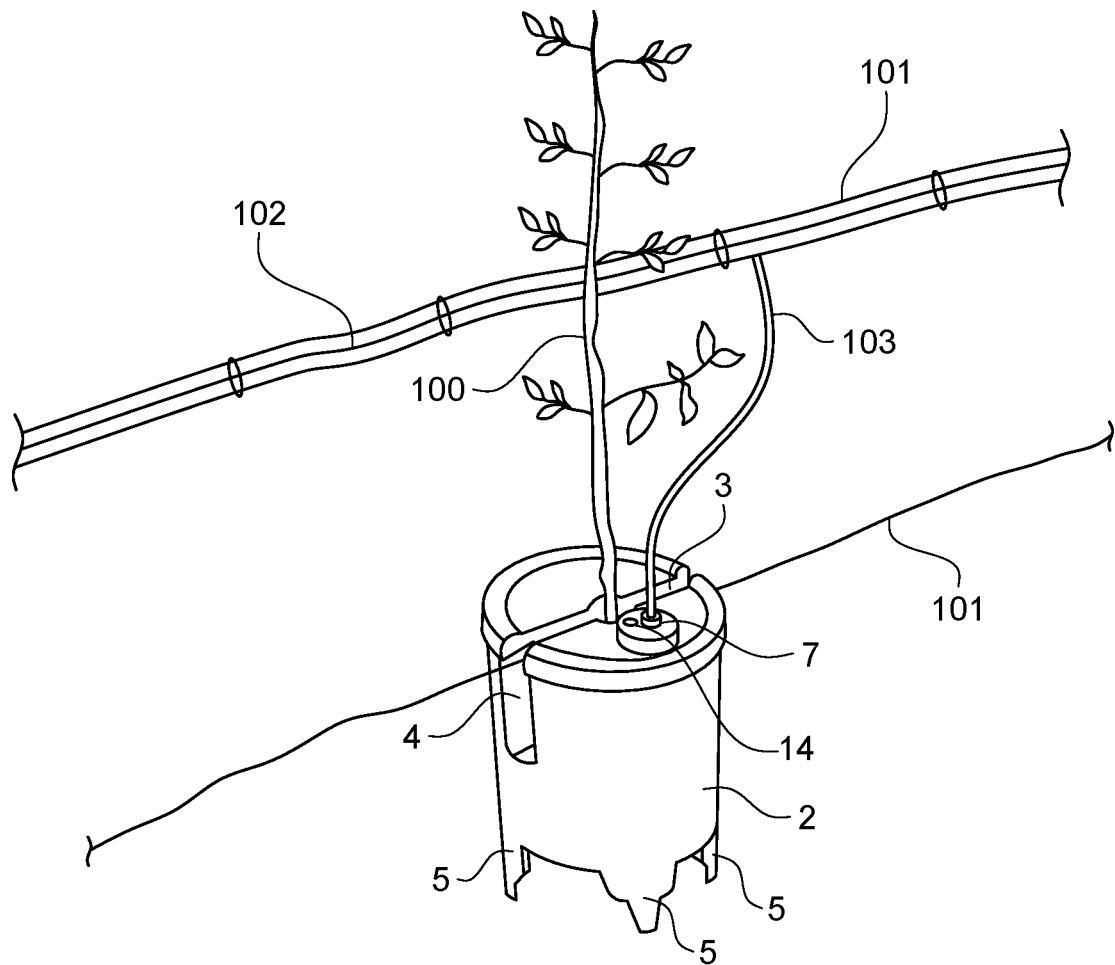
FIG. 2 illustrates the watering device of FIG. 1 together with a tree and a watering system of an orchard connected to the device.
Figure 5:
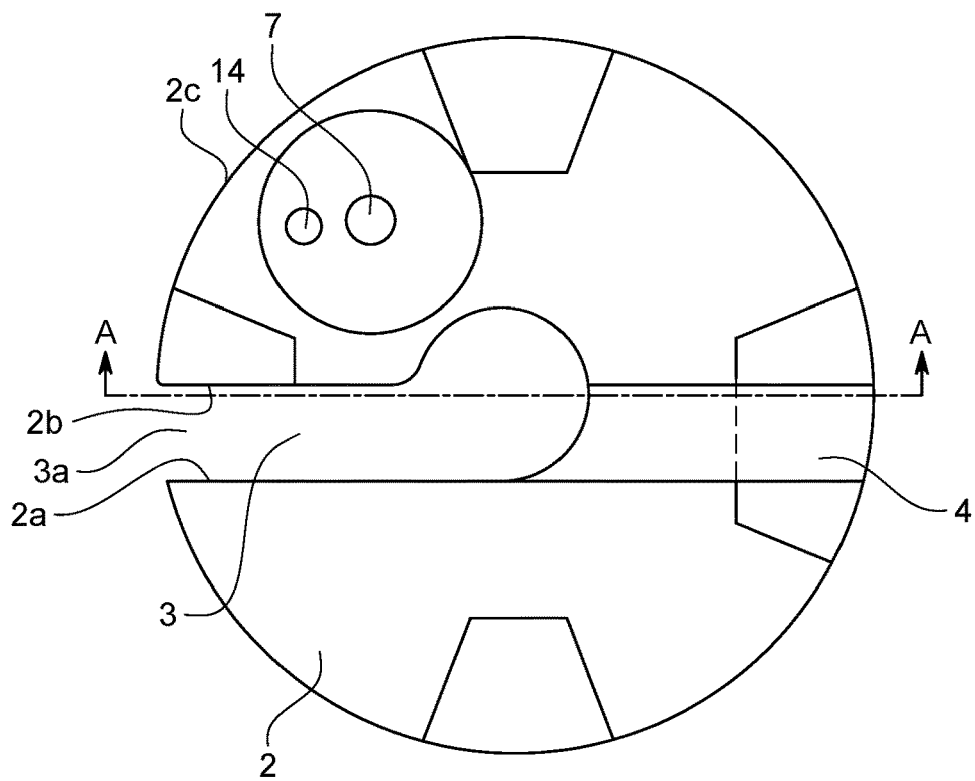
FIG. 5 is a top view of the device of FIG. 1.

The container 2 is situated adjacent to a tree 100 during use. For example, in the illustrated embodiment the container comprises a vertical slot 3 that extends a full height of the container 2. In a plan view (refer FIG. 5 the slot 3 may extend from a central portion of the container 2 to a side wall of the container, to be open at a top, bottom and side wall of the container. The slot is defined by inner walls 2a and 2b (FIG. 5) of the container 2, extending from the bottom of the container to the top of the container. The slot has a slot opening 3a at an external side wall 2c of the container. As shown in FIGS. 1 and 2, the container 2 is placed to extend about the tree by receiving the tree trunk into the slot 3 via the slot opening at the side wall of the container, so that the trunk of the tree received in the slot at the central part of the container. In this configuration the container 2 is positioned to extend around the tree but for the side opening 3a at the side wall of the container 2 through which the slot extends for receiving the tree trunk therethrough. In this embodiment the container 2 provides mechanical protection for or provides a barrier around the trunk of the tree, to prevent damage from mechanical impacts or from animals.

As shown in FIGS. 2 to 5, in the illustrated embodiment, the container 2 further comprises a second vertical slot 4. The second slot 4 may extend diametrically opposite to the first slot 3 extending the full height of the container. The second slot 4 extends from the centre of the container to a side wall of the container opposite to the first slot 3. Preferably the first and second slots 3 and 4 are aligned to extend in a straight line across a top of the container and through the centre region of the top of the container. As described above, the first slot 3 extends a fully height of the container. However, the second slot 4 extends vertically from a top of the container 2 and part way down the container. As best shown in FIG. 2, the first and second slots allow for a tree supporting structure in an orchard, for example a wire 101 or wires retained between posts (not shown), to extend through the first and second slots 3, 4 of the container 2, to allow the container 2 to be placed around the tree trunk without interfering with the supporting structure. The second slot extends vertically for a substantial portion of the height of the container, for example at least 20% of the height of the container. In the illustrated embodiment the second vertical slot extends approximately half the height of the container.

The above described container 2 is a preferred embodiment by way of example only. In other embodiments of the invention, the container 2 may be without the second slot 4, or without the first and second slots 3, 4. For example, a container 2 without the first and second slots may be placed beside the trunk of a tree. However, this is less desirable. In modern orchards, space between rows of trees is kept to a minimum to allow for a maximum number of trees per land area. Spacing between rows of trees is typically determined based on a minimum width required to allow machinery such as harvesting machines and/or mowing machines to pass between rows. Where a container is placed beside a row of trees the container may encroach into the space between rows, causing access issues for machinery to pass.

The container preferably comprises legs 5 to support the container from a ground surface. The legs 5 position a bottom of the container above the ground surface. The bottom of the container may be around 100 mm or so above the ground surface. With the bottom of the container covering over the ground surface extending around the tree, the container 2 helps to reduce evaporation of moisture away from the ground from the important root area of the tree. Additionally, the colour of the watering container 2 is preferably chosen to eliminate evaporation of stored and applied water. The position of the device to cover over the root zone may also create a microclimate beneath the device, encouraging microorganisms in the soil beneficial to plant growth. A bottom portion of the legs may be formed as spikes or stakes to penetrate the ground to secure the container in position. This may be particularly useful to maintain the device in a correct position when the container 2 is empty to prevent the device moving, for example being blown over by a strong wind. In FIGS. 1 and 2 the bottom portion of the legs forms spikes are not pressed into the ground surface so that these features are visible.

Figure 3:
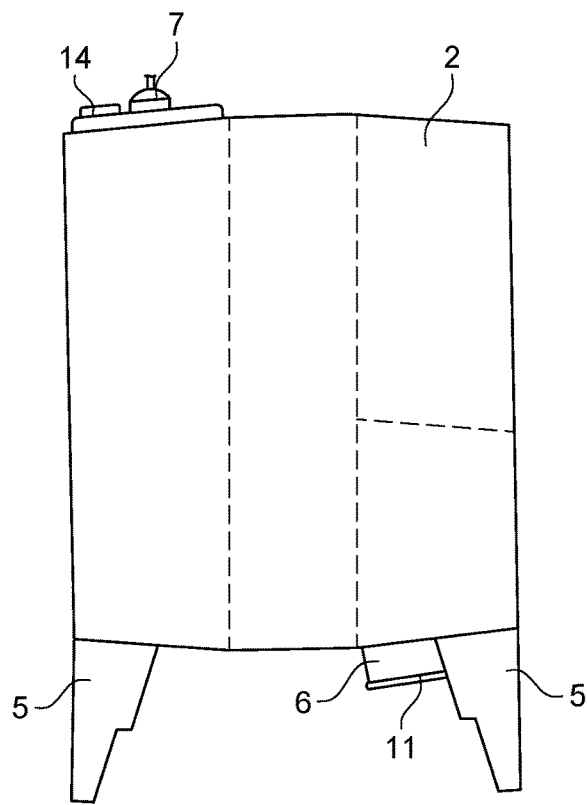
FIG. 3 is a side view of the device of FIG. 1.
Figure 4:
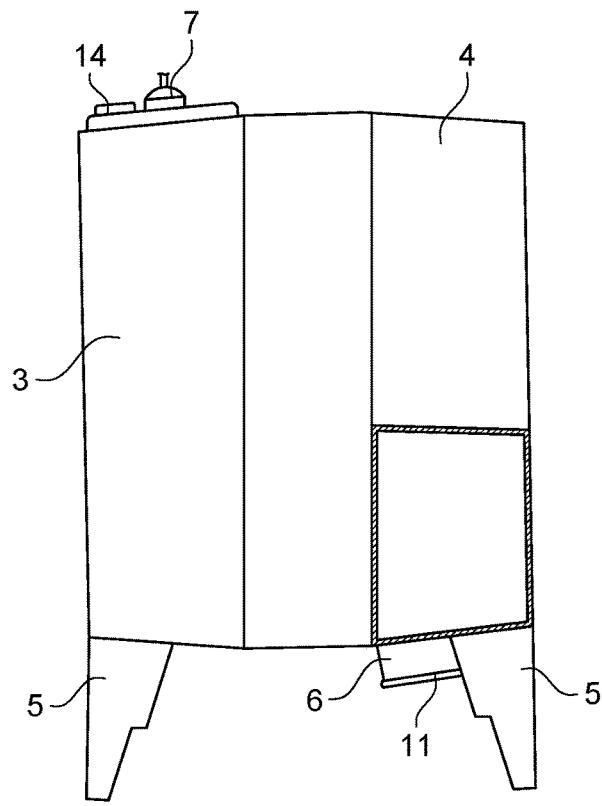
FIG. 4 is a sectional view of the device on line A-A shown in FIG. 5.
Figure 6:
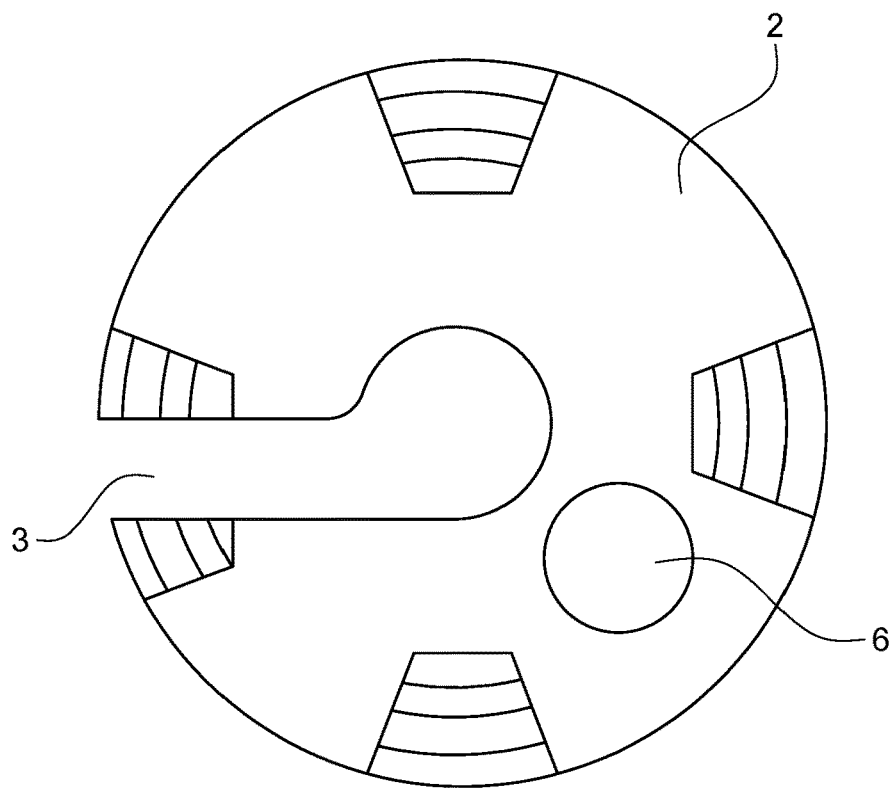
FIG. 6 is a bottom view of the device of FIG. 1.

The device comprises one or more outlets. Preferably the outlet(s) 6 are positioned in a bottom of the container 2, as shown in FIGS. 3, 4 and 6. The outlets allow water to discharge from the container to provide water to the tree roots via a ground surface around or adjacent to the tree (the root zone). In a preferred embodiment, the outlet(s) 6 allow water to drip from the container. The outlet(s) 6 are described in more detail below.

The container has one or more inlets 7 through which the container 2 may be filled with water. Importantly, the container is pressurisable so that during use the device 1 can achieve a positive pressure inside the container 2, i.e. the container is pressurisable so that an inside of the container is pressurised to a pressure level higher than the outside surrounding ambient/atmospheric pressure. To be pressurisable the container must be sealed, i.e. air tight.

Figure 7:
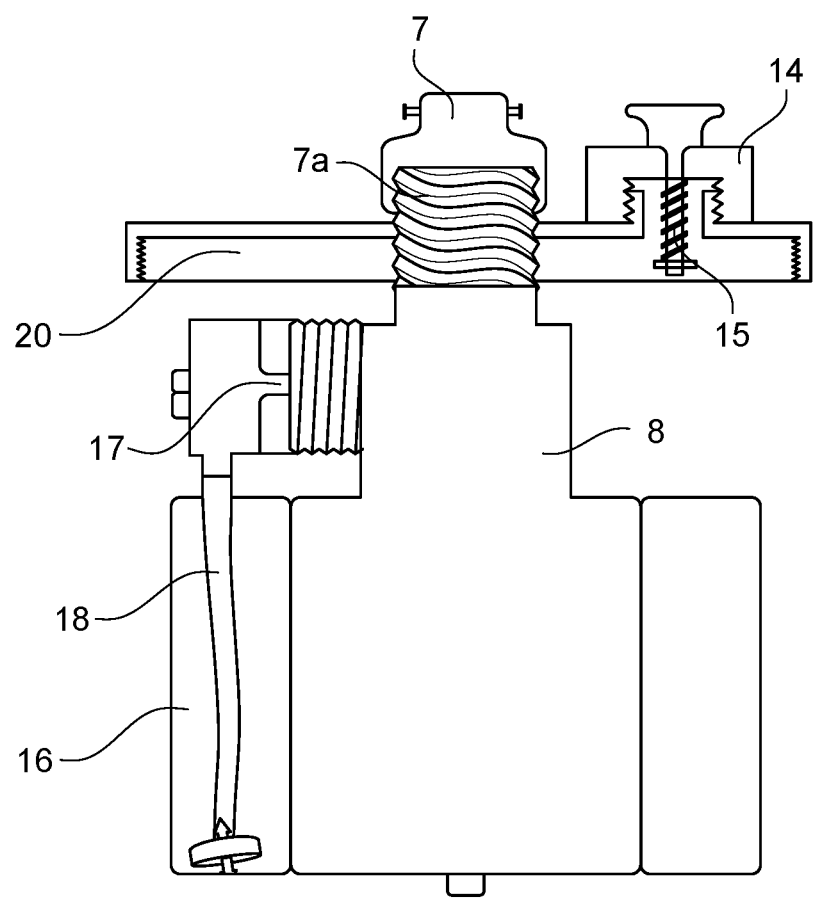
FIG. 7 is a schematic side view of an inlet assembly of the device of FIG. 1.
Figure 8:
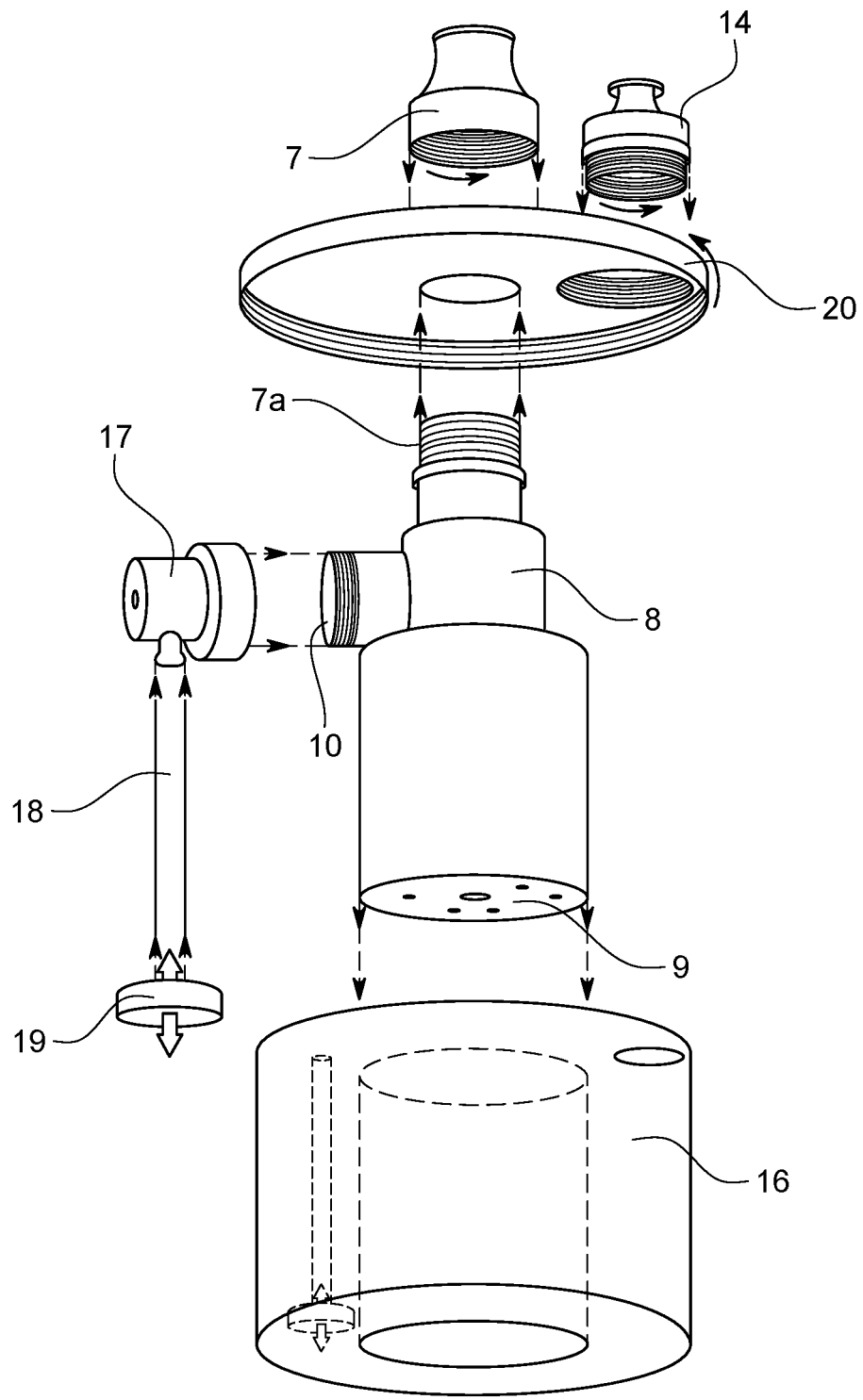
FIG. 8 is an exploded view of the inlet assembly of FIG. 7.

In a preferred embodiment, the device 1 comprises an inlet valve. FIGS. 7 and 8 illustrate an inlet assembly comprising the inlet 7 and an inlet valve 8. The inlet valve 8 is configured to open to allow the container 2 to fill with water and is close when the container is full. In the illustrated preferred embodiment, the device comprises a float-controlled inlet valve 8 to open and close the valve 8 and therefore the inlet 7 based on the water level in the container. When the water level in the container reaches an upper limit or maximum water level a float 9 lifts to close off or actuate the valve 8 to close to prevent the container over filling. When the valve 8 is closed the container is sealed (i.e. is airtight). When the water level drops to a level below the upper limit the valve 8 opens to allow water to flow into the container to fill the container. The upper limit or maximum water level may be defined by a level band. The valve 8 may have an inlet 7a that forms or is fluidly connected to the device inlet 7, and an outlet 10 situated inside the container 2. An example valve is WIIR brand float valve, model DBS15 ½ top inlet valve. Alternative inlet valve arrangements may be provided. For example, a valve may be electrically operated (i.e. by an electromechanical actuator) between open and close triggered a sensor that senses a water level or pressure within the container. However, preferably the water valve is purely mechanical to avoid the requirement for electrical power.

In a preferred installation, the device remains connected to a pressurised water supply system during use, such as an existing irrigation system within an orchard. For example, the device is intended to be connected to a water supply system for many months or a year or more. The inlet may include a quick connect type fitting to easily connect and disconnect the supply system to the device. Preferably the device may be retrofitted to an existing irrigation system. When the water level in the container 2 decreases, causing the valve 8 to open, if the water supply system is turned on, water flows into the container to fill the container. Alternatively, when the valve opens, the water supply system may be turned off, in which case the container does not fill until the water supply system turns on. The pressurised water supply may have a typical 'mains pressure' of at least several 100 KPa, for example 200 to 1000 Kpa, or 300 to 700 KPa.

As stated in the preceding paragraph, in a preferred installation, the device remains fluidly connected to an existing irrigation system of an orchard. Irrigation systems typically have a water conduit (102 in FIGS. 1 and 2) extending along a row of trees, with an outlet such as a nozzle connected to the conduit at the location of each tree. A device 1 according to the present invention is located at a tree and connected to the water conduit 102 of the water supply system, for example via a secondary conduit 103. When the water supply system 102, 103 turns on, rather than watering the tree directly via an outlet or nozzle of the irrigation system, the water supply system instead fills the container 2. Once full, the inlet valve 8 closes, even if the irrigation system remains on to continue to provide water directly to other trees within an orchard. The device 1 thus operates as an accumulator, to store a volume of water at the tree for use in watering the tree over a further time period, for example when the irrigation has been turned off.

Figure 9:
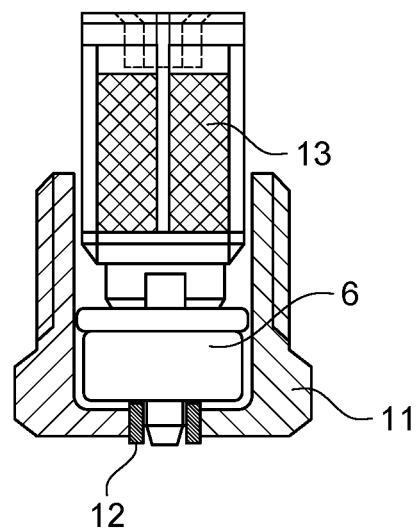
FIG. 9 illustrates an outlet assembly of the device of Figure with hidden details shown.
Figure 10:
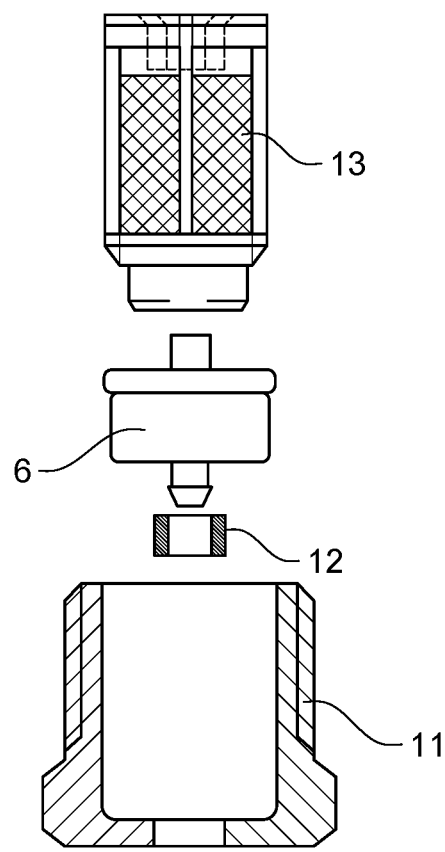
FIG. 10 is an exploded view of the outlet assembly of FIG. 9.

The one or more outlets 6 provides water from the device at a predetermined rate. The predetermined rate is typically significantly less than the rate at which water would be applied directly to a tree from the orchard irrigation system. For example, an orchard irrigation system may typically apply water to one tree at a flow rate of around 50 L/hour and provide large volumes of water two or three times a week, up to around a total of 450 L per tree per week. Such a rate and volume of water is required for watering larger developed trees within the orchard. However, such a rate and/or volume is much too great for younger, smaller trees with much of the irrigation applied outside the rootzone and unavailable to the tree. An orchard may have a mixture of older larger trees and younger smaller trees. Insufficient or excess of water can have serious consequences on the health of young trees, negatively impacting a tree's growth. Thus, a device according to the present invention may be connected to the irrigation system at the site of a young tree. The device prevents insufficient or excessive water being applied to the tree, by filling and therefore accumulating water in the container for watering the tree at a lesser rate, over an extended duration With reference to FIGS. 9 and 10, in some embodiments the device comprises an outlet assembly.

The outlet assembly is preferably fitted to the base or bottom of the container 2. The outlet assembly comprises the outlet 6. In the illustrated embodiment the outlet is an emitter 6 for emitting water at a low flow rate, for example less than 1 L per hour, or less than 0.5 L/hour. The emitter 6 preferably emits drips from the container, i.e. the outlet emits a drip flow rate from the device. Example outlets are emitters Naandanjain Clicktif PC 1.3 L/H or Bowsmith SB 3.8 L/H.

The outlet assembly comprises a plug 11. The plug 11 is removably fitted to the container 2. For example, the plug 11 comprises a screw thread to be threaded into a complimentary thread in the container wall or base. The plug has a passageway through the plug and the emitter 6 is fitted in fluid communication with the plug passageway. A watertight seal is provided between the plug 11 and the emitter 6. In the illustrated embodiment, a rubber grommet 12 is received in the passageway and provides a seal between the plug 11 and the emitter 6. The illustrated embodiment also has a filter 13. The filter 13 is fitted to the plug 11, with the emitter 6 enclosed by the plug 11 and filter 13. The filter may comprise a filter mesh formed into a cup to cover over the emitter. The filter 13 is preferably releasably attached to the plug 11. An example filter is a 120 micron plastic mesh screw in filter to be screwed into an internal side of the plug 11. The outlet assembly may be removed from the container 2, so that different flow rate emitters can be fitted to the container, to make the device configurable to provide a desired flow rate depending on requirements for a particular tree. The container 2 may be configured to receive a plurality of outlet assemblies, for example may include a number of sockets to receive a corresponding number of outlet assemblies.

The device is preferably configured to provide water continuously. That is, the container 2 is sized commensurate with respect to parameters of the water supply system so that the container remains at least partially full during normal operation of the water supply system, to provide water from the one or more outlets 6 continuously. Ideally the container capacity is sized so that a frequency and volume of water that the supply system 100 provides to an individual tree in an orchard is sufficient to maintain the container continuously at least partially full, to ensure the device 1 provides a continuous supply of water to a tree, but can be configured depending on the trees growth stage and water requirements.

In a preferred embodiment the device comprises a pressure relief mechanism to limit the pressure in the container to a maximum pressure level. The pressure relief mechanism operates to automatically release pressure from the container when the pressure reaches or exceeds a pressure threshold. For example, with reference to FIGS. 7 and 8, the pressure relief mechanism may be a pressure relief valve 14, which automatically opens or 'cracks', to release pressure from the container and therefore limit the pressure within the container to the maximum pressure level. In a preferred embodiment, as the container 2 fills with water, the pressure within the container increases as a volume of air within the container is compressed, causing the pressure relief valve to operate to prevent the pressure increasing beyond the maximum pressure level. When the pressure relief mechanism is closed and the inlet valve is closed, the container is sealed, i.e. air tight. The supply pressure of the water supply system is greater than the maximum pressure, so that with the inlet valve open, the water entering the container causes the pressure in the container to build up as the container fills up to the maximum water level at which point the inlet valve closes.

The pressure relief mechanism 14 may be set to achieve a maximum pressure in the container of around 30 kPa to 100 kPa. The maximum pressure is preferably significantly less than the pressure of the pressurised water supply system that the device connects to in use. For example, the maximum pressure is less than 30%, or less than 25%, or less than 20% of the pressure of the water supply system.

In a preferred embodiment, the pressure relief mechanism 14 and the outlet(s) are complimentary adapted so that as the container fills the maximum pressure is reached and maintained for the duration of the filling cycle.

Preferably when the pressure is at the maximum pressure level, the pressure in the container achieves a flow rate through the outlets that is sufficiently elevated to assist with flushing debris from the outlet(s). As the water level drops in the container 2 as water discharges from the container via the outlet(s) 6, the pressure level in the container decreases, and the flow rate through the outlet(s) decreases to a flow rate suitable for effective watering over a long term. This 'high pressure' flushing feature provides for long term operation of the device, removing the need for frequent maintenance required to clean out the outlets to prevent blockages.

Preferably the valve 8, pressure relief mechanism 14, and the outlet(s) 6 are complimentary adapted so that the pressure within the container 2 increases to a level as the container fills so that once the water level reaches the maximum water level causing the inlet valve to close the inlet 7, the pressure level achieved in the container 2 has resulted in a flow rate (a first flow rate) through the outlet(s) that is sufficiently elevated to assist with flushing debris from the outlets to remove any build-up or clogging within the outlets. As the device empties of water, the pressure within the container reduces. The reduced pressure results in a flow rate (a second flow rate) that is substantially less than the elevated flow rate sufficient for flushing. The reduced flow rate is suitable for long term and/or continuous watering.

In a preferred embodiment the outlet 6 comprises a pressure compensated outlet device configured to provide a constant or nominal flow rate over a predetermined pressure range. An example outlet device is Naandanjain Clicktif PC 1.3 L/H which provides a flow rate of 1.3 L/Hr in a pressure range of 50 kPa to 400 kPa. Such a device may be described as being a pressure compensated device. To assist with flushing debris from the outlet, in a preferred embodiment the pressure in the container as it fills to its maximum water level results in a flow rate that is substantially equal to or greater than the nominal flow rate for the emitter. For example, the flow rate through the emitter is at least 80% of the emitter nominal flow rate for the compensated pressure range for the emitter, or at least 90% of the nominal flow rate. A flow rate that is at least substantially equal to the nominal flow rate is sufficient to flush debris from the outlet.

For example, the Naandanjain Clicktif PC 1.3 L/H emitter has a flow rate of 1.3 L/hr in the pressure compensated range of 50 kPa to 400 kPa. The inventor has determined that for a pressure of 30 kPa, the flow rate through the emitter is around 1.3 L/Hr. This nominal flow rate is sufficient to flush the emitter of debris. For flow rates much less than the nominal flow rate, the emitter may become clogged, requiring ongoing maintenance in the field. When a blockage goes unnoticed a tree may not receive an expected amount of water.

For example, a device 1 may comprise a 20 L container, an inlet valve configured to close at a maximum level within the container of 18 L, and a pressure relief mechanism set to 30 kPa (4.35 psi or about 0.3 atmosphere). The pressure relief mechanism may be a pressure relief valve with a 30 kPa cracking pressure. As the device fills to 18 L, the pressure level increases to a level to cause the pressure relief valve to operate, so that the pressure within the container as it fills to 18 L is 30 kPa. The outlet may comprise a drip emitter such as emitter Naandanjain Clicktif PC 1.3 L/H. As noted above, this emitter has a flow rate of 1.3 L/Hr for a pressure range of 50 kPa to 400 kPa. At a pressure of 30 kPa, the flow rate from the drip emitter increases to about 1.3 L/hour, a flow rate high enough to assist with flushing debris from the emitter. Once the container has completed the filling cycle the pressure within the container reduces as the container empties and the outlet flow rate through the emitter reduces. In this example configuration a flow rate of around 0.22 L/hour is achieved. This is suitable for long term and/or continuous watering.

Figure 13:
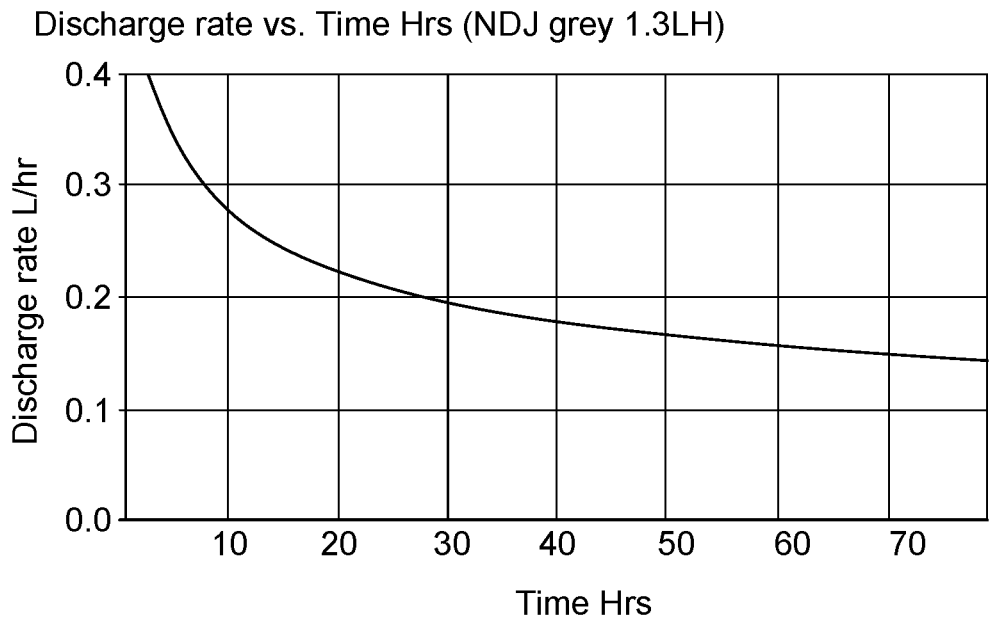
FIG. 13 shows a chart of flow rate from an outlet of the device of FIG. 1 over time.

For example the device 1 may be configured to provide an average flow rate of around 0.22 L/hour continuously over a period of 78 to 80 hours for a 20 L unit. An example discharge flow rate is illustrated in FIG. 13. As indicated, the flow rate decrease rapidly from a nominal flow rate (1.3 L/hr) to less than 50% of the nominal flow within several hours after filling, and reaches a long term low flow rate of around 0.25 L/hour after about 14 hours. It is to be appreciated that larger devices may be provided, with a larger volume container to lengthen the time period in which continuous watering can be provided and/or with higher flow rate outlets to provide higher flow rates as required for larger trees. The flow rate of the outlet(s) is preferably less than water infiltration into and through the soil, ensuring optimal soil moisture conditions and nutrient availability in the effective rootzone of the tree.

A possible benefit of providing a sealed pressuriseable container is that on a warm or hot day, air within the container expands, causing the pressure within the container to increase. This in turn causes a larger flow rate to be emitted from the device, which may be beneficial since trees tend to require more water on warm or hot days compared to cooler days.

Again with reference to FIGS. 7 and 8, in the illustrated embodiment the inlet, inlet valve 8 and pressure relief mechanism 14 are mounted on a cap 20. The cap 20 is fitted to a corresponding opening on the top of the container. The cap forms an airtight seal with the container. The cap 20, inlet 7, inlet valve 8 and relief valve 14 form an inlet assembly of the device 1. In FIG. 7 the pressure relief valve 14 is shown in a closed or sealed position by the action of a spring 15. When the pressure level increases in the container 2 the pressure relief valve 14 is (automatically) operated against a spring bias of the spring 15 to open and relieve air, to limit the pressure within the container 2. Pressure is relieved without manual intervention by a person.

Other pressure relief mechanisms are possible, for example an electrical sensor and electrically operated relief mechanism, however preferably a pure mechanical pressure relief mechanism is provided to avoid a requirement for electrical power.

Figure 11:
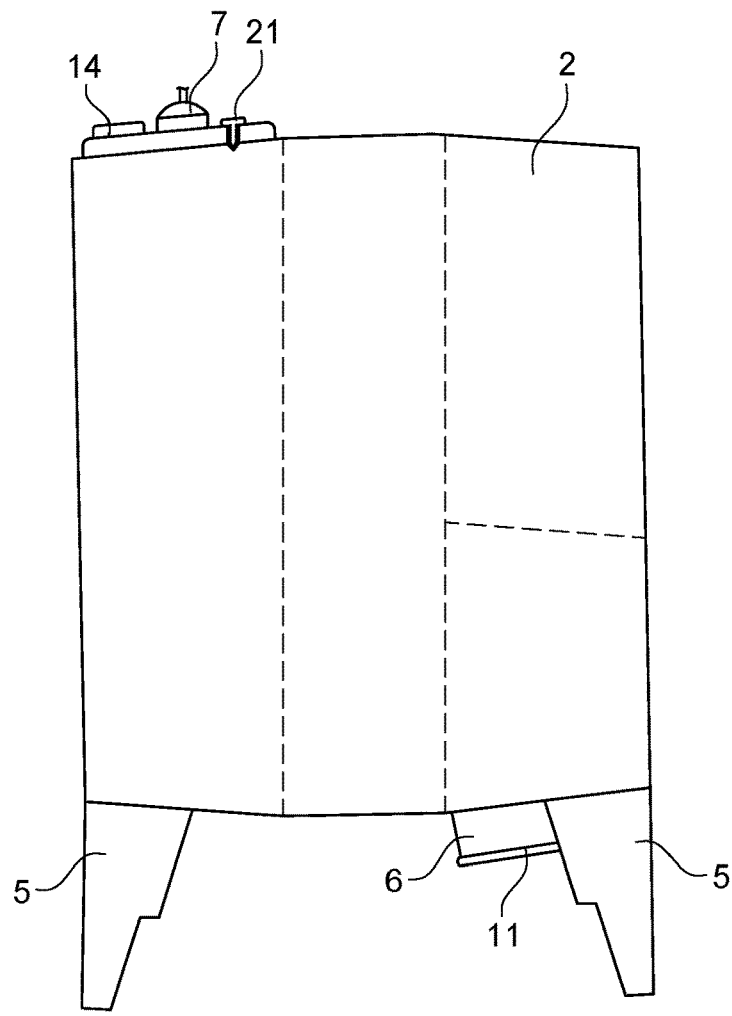
FIG. 11 is a side view of a further embodiment similar to the embodiment of FIG. 1 but additionally comprising an air let valve.

As described above, the pressure in the container increases as the container fills with water and reaches the maximum pressure set by the pressure relief valve 14. The pressure relief valve 14 may be described as an air release valve. As the water drains from the container through the outlet 6, the pressure in the container decreases to below the maximum pressure, and the flow rate through the outlet also drops. As the pressure in the container drops, connection to an irrigation system may prevent a vacuum in the container via the inlet 7. However, in a preferred embodiment the device may further comprise an air inlet valve. With reference to FIG. 11, the device further comprises an air inlet valve 21 to allow air to be drawn into the container 2 as the container empties, to prevent a vacuum in the container. At a pressure inside the container greater than ambient pressure the air inlet valve 21 is closed, sealing the container. As the container fills with water, the air inlet valve remains closed. As the container empties and the pressure in the container may drop to less than ambient pressure, the air inlet valve opens, to allow air into the container to equalise the pressure inside the container and prevent a vacuum. The air inlet valve 21 may be a duckbill valve.

Figure 12A:
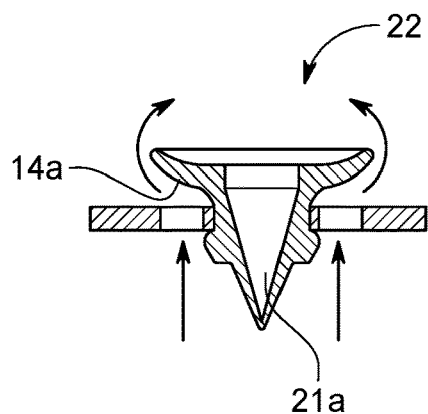
FIGS. 12A and 12B illustrate an example valve arrangement comprising an air inlet valve and a pressure relief valve.
Figure 12B:
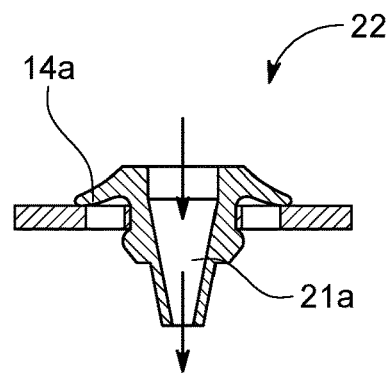

A preferred valve arrangement is illustrated in FIGS. 12A and 12B. The valve arrangement comprises a pressure relief valve 14a and an air inlet valve 21a. The pressure relief valve 14a is an umbrella valve, and the air inlet valve is a duckbill valve 21a. The umbrella valve 14a comprises a umbrella component that flexes to cover over apertures, e.g. in a lid of the container. In the illustrated embodiment the umbrella and the duckbill valve are integrally formed as a single unitary member 22. The single unitary member is an elastomeric member. An example valve arrangement is provided by Seiko Rubber & Plastics Co Ltd, part no. JT1025, silicone combined duckbill and umbrella valve. This example duckbill valve has an opening pressure of 0 to 5 kPa. A pressure range of 0 to 5 kPa may be considered to be (substantially) equal to ambient pressure, i.e. at this operating range the air inlet valve is configured to maintain an ambient pressure within the container to prevent a vacuum. The umbrella valve has an opening pressure of 8 to 30 kPa.

The combination of an air inlet valve and a pressure relief valve may be described as a two way valve arrangement. When the pressure relieve valve is open the air inlet valve must be closed (FIG. 12A), and when the air inlet valve is open the pressure relieve valve must be closed (FIG. 12B). Both valves may be closed, i.e. when the pressure within the container is greater than ambient but less than the cracking pressure of the pressure relief valve (not illustrated). When both valves 14, 21 are closed and the inlet valve 7 is closed, the container 2 is sealed from the ambient environment and the pressure within the container 2 may be a positive pressure. The pressure relief valve 14 illustrated in FIG. 7 may be replaced by the valve arrangement 22 of FIG. 12.

The air inlet valve 21 achieves ambient pressure within the container as the container empties. At ambient pressure, the flow rate through the outlet(s) of the device is significantly less than the nominal flow rate of the outlet at a pressure in the compensated pressure range for the outlet. For example, at ambient pressure the flow rate is less than 25% of the pressure compensated flow rate. The ambient pressure flow rate is suitable for long term/continuous watering.

In some embodiments, the device 1 comprises a nutrient dispenser to dispense nutrients into the water within the container 2 to achieve long term fertigation. Again, with reference to FIGS. 7 and 8, the device 1 may comprise a liquid nutrient reservoir 16 and a venturi 17 to suck nutrient from the reservoir 16 as water flows into the container 2. For example, the venturi 17 may be located at the device inlet 7. In the illustrated embodiment the venturi 17 is located adjacent the valve outlet 10. A dip tube 18 or pick up tube received in the nutrient reservoir 16 is attached to the venturi 17. A flow control device 19 may be provided inline with the dip tube 18 to ensure a correct rate and therefore volume of nutrient is dispensed into the container. As water flows from the inlet valve 8 the water passes through the venturi 17 to suck nutrient from the reservoir 16 into the container 2. In the illustrated embodiment the nutrient reservoir 16 is annular and is received around the float 9 of the float operated inlet valve 8.

Figure 14:
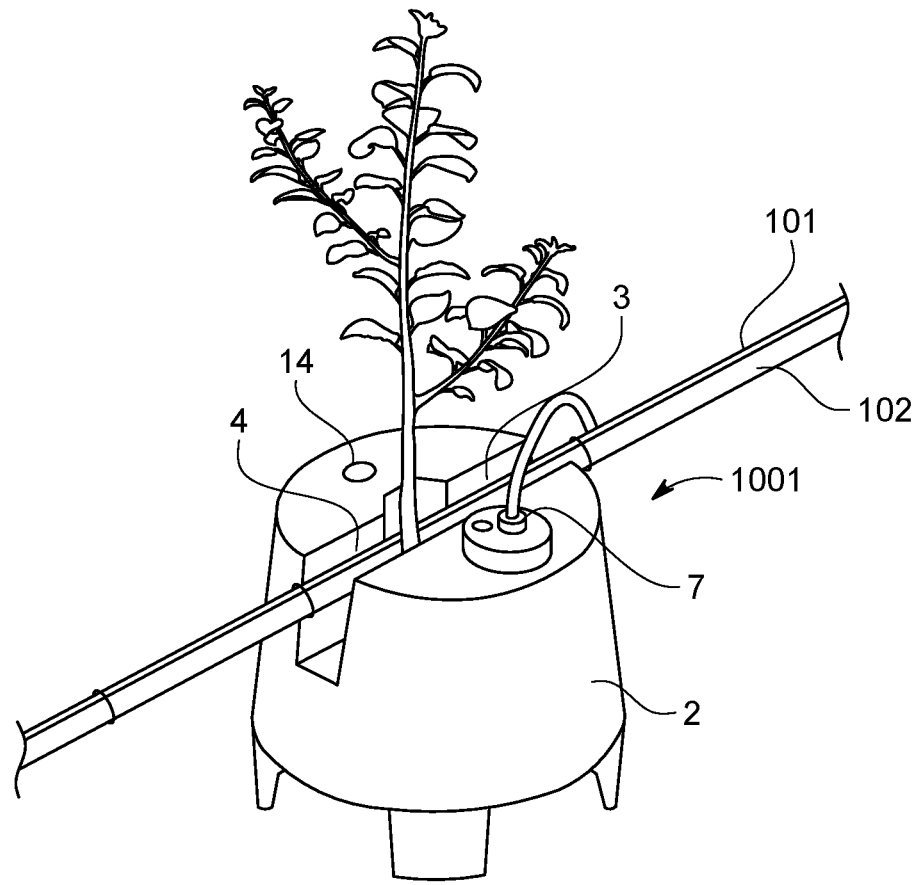
FIG. 14 shows another embodiment of a device according to the present invention in situ around a tree.

FIGS. 14 to 15E show a device according to another embodiment of the invention. Features of the device 1001 that are the same as or similar to features of the above-described embodiment 1 are referenced by the same reference numerals and are not described again for brevity.

As described above, in a preferred embodiment, the container has a first slot 3 and second slot 4. The two slots result in two upper portions in the container 2 separated by the first and second slots 3, 4. When the water level in the container 2 is above the bottom of the second slot 4, the inside of the container 2 has two separate upper portions. One upper portion of the container is fitted with the pressure relief mechanism 14 (shown in FIG. 14) and the other side is without the pressure relief mechanism and therefore remains sealed. As the water level in the container 2 rises above the bottom of the second slot 4, air pressure in the sealed side of the container (the side without the pressure release mechanism) may build to a point where the internal pressure is greater than the pressure in the other side with the pressure relief mechanism. At this point the sealed side without the pressure relief mechanism may stop filling in preference of the lower pressure side of the container. An issue with this situation is that the container fills to a smaller volume than it would otherwise fill due to the air trapped in the sealed upper portion of the container.

To maximise the usable container volume, the device 1001 may comprise a tube or conduit provided to an inside of the container 2. The tube may have a first end located in one of the two upper portions of the container 2 and a second opposite end located in the other one of the two upper portions of the container, to fluidly connect the upper portions of the container. The two ends of the tube are positioned above the maximum water level in the container set by the inlet valve 8 (not shown in FIGS. 14 to 15E).

When water fills to above the bottom of the second slot 4, the tube connects and therefore equalises the pressure in the two upper portions of the container 2 so that the pressures in the upper portions of the container are the same and with both upper portions fluidly connected to the pressure relief mechanism. By example, the tube or conduit may be a polyvinyl chloride irrigation tube (4 mm diameter) however any suitable tubing may be used. The tube is preferably inserted into the container 2 to contact the bottom of the container below the second slot 4 with the ends located adjacent a top of the container. The tube may be formed into a 'U' shape. The tube may be unattached to the container but remain in place due to the shape of the tube and/or the container.

In an alternative embodiment, a pressure relief mechanism may be fitted to both upper portions of the container. For example, an additional pressure relief mechanism may be fitted to an aperture in the top of the container as indicated in FIGS. 14, 15A and 15E. However, this may be less preferred due to additional cost and complexity in ensuring both mechanisms operate at the same pressure.

In FIG. 14 the pressure relief mechanism 14 (which may be provided by valve member 22) is shown in the upper portion opposite to the inlet 7. However, the pressure relief mechanism 14 may be provided to the upper portion to which the inlet 7 is provided, for example the pressure relief mechanism 14 may be mounted on the cap 20 together with the inlet 7 as described above in relation to the earlier embodiment.

The additional aperture shown in the top of the container in FIGS. 14, 15A and 15E may be sealed with a cap/plug and used to add fertiliser to the container for fertigation.

Figure 16:
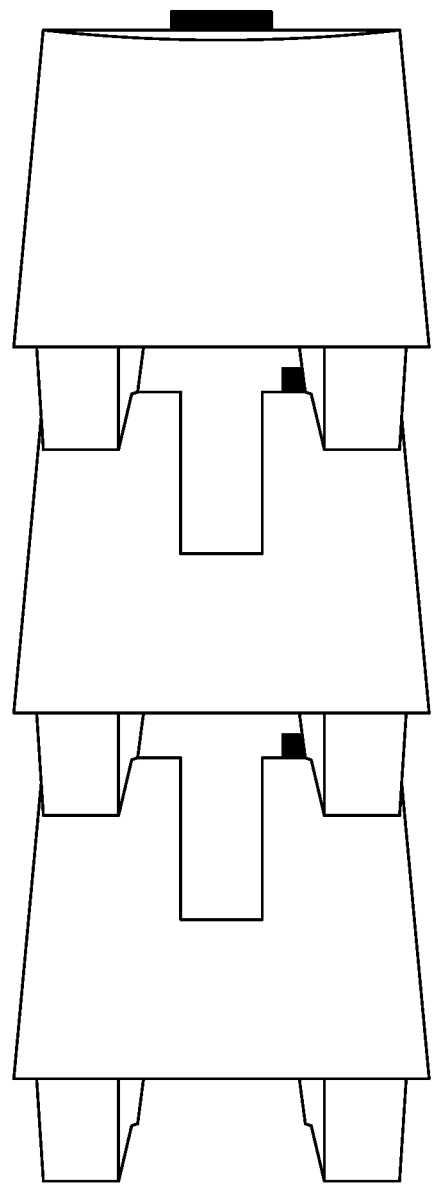
FIG. 16 show containers of FIGS. 15A to 15E stacked for transportation or storage.

FIG. 16 shows the container 2 of the device shaped and configured to allow for stackability of multiple devices 1001 or containers 2 for storage and/or transportation.

A device for watering a tree according to the invention achieves one or more of the following benefits.

- The device may be configured to provide a desired amount of water to a tree for optimal performance.
- When fitted to an irrigation system of an orchard the device provides for a reduced flow rate and volume to an individual tree compared to a flow rate and volume provided by the irrigation system to other trees within the orchard. The device may be set up to provide a desired amount of water to the individual tree, such as a young three, to improve growth rate and health of the tree.
- The device can be configured to provide an ultra low rate of water to the rootzone of a tree continuously during peak growth, which is a preferred watering regime for smaller or young trees.
- The device can reduce wastage and associated cost with over watering.
- The device avoids a requirement for ongoing maintenance since the outlets self flush each time the device fills.
- The device can provide physical protection for the tree.

Although this invention has been described by way of example and with reference to possible embodiments thereof, it is to be understood that modifications or improvements may be made thereto without departing from the spirit or scope of the appended claims.

The invention claimed is:

1. A device for watering a tree, the device comprising:
a water container,
an inlet to receive water into the container,
an inlet valve configured to close the inlet to the container when a water level within the container reaches a maximum water level and open when the water level drops below the maximum water level,
a pressure relief mechanism to limit a pressure in the container to a maximum pressure greater than ambient pressure, and
one or more outlets to allow water to discharge from the container to apply water to a rootzone of a tree in use, and
an air inlet valve configured to prevent a vacuum within the container as the container empties of water; and
wherein the pressure relief mechanism and the air inlet valve are integrally formed as a single unitary member.

2. The device as claimed in claim 1, wherein the device is configured so that as the container fills with water the pressure within the container results in a flow rate through the outlet that assists with flushing debris from the outlet.

3. The device as claimed in claim 1, wherein the device is configured so that as the container fills with water the pressure within the container results in a first flowrate through the outlet(s) and as the container empties of water the pressure within the container results in a second flow rate, wherein the second flow rate is substantially less than the first flow rate.

4. The device as claimed in claim 3, wherein the second flow rate is less than 25% of the first flow rate.

5. The device as claimed in claim 4, wherein the first flow rate is substantially equal to or greater than a nominal flow rate of the outlet(s).

6. The device as claimed in claim 1, wherein the outlet comprises a pressure compensated outlet device configured to provide a nominal flow rate for a predetermined pressure range.

7. The device as claimed in claim 6, wherein the device is configured so that as the container fills with water the pressure within the container results in a flowrate substantially equal to or greater than the nominal flow rate of the pressure compensated outlet device.

8. The device as claimed in claim 7, wherein the device is configured so that as the container empties of water the pressure within the container decreases to below the maximum pressure resulting in a flow rate substantially less than the nominal flow rate.

9. The device as claimed in claim 1, wherein the pressure relief mechanism is an umbrella valve comprising an umbrella element and the air inlet valve is a duckbill valve.

10. The device as claimed in claim 1, wherein the device is configured to be connected to a pressurised water supply system, and wherein a maximum pressure is substantially less than a pressure of the pressurised water supply system.

11. The device as claimed in claim 10, wherein the pressurised water supply system to which the device is configured to be connected is an irrigation system for an orchard and the device is configured to form a water accumulator for the irrigation system for providing water to a tree at a flowrate significantly less than a flow rate provided by the irrigation system.

12. The device as claimed in claim 1, wherein the device is configured to provide water continuously to a tree.

13. The device as claimed in claim 1, wherein the one or more outlets comprise a drip emitter that is configured to emit a drip flow rate.

14. The device as claimed in claim 1, wherein the outlet is interchangeable to allow outlets with different flow rates to be fitted to the container.

15. The device as claimed in claim 1, wherein the container comprises:

a first vertical slot that extends a full height of the container to receive a tree therein via a slot opening at an external side wall of the container, and a second vertical slot that extends from a top of the container to part way down the container, the second vertical slot extending to a side wall of the container opposite to the first slot, wherein the second vertical slot extends diametrically opposite to the first vertical slot.

* * * * *